United States Patent

Matsui

[11] 4,099,850
[45] Jul. 11, 1978

[54] WIDE ANGLE PHOTOGRAPHIC LENS
[75] Inventor: Sei Matsui, Chiba, Japan
[73] Assignee: Nippon Kogaku K.K., Tokyo, Japan
[21] Appl. No.: 765,605
[22] Filed: Feb. 4, 1977
[30] Foreign Application Priority Data
  Feb. 5, 1976 [JP] Japan .................. 51-11566
[51] Int. Cl.$^2$ .................................. G02B 9/60
[52] U.S. Cl. .................................. 350/215
[58] Field of Search .................................. 350/215
[56] References Cited
  U.S. PATENT DOCUMENTS
  3,955,883  5/1976  Sugiyama .................. 350/215
  FOREIGN PATENT DOCUMENTS
  83,408  6/1964  France .................. 350/215
  26,133/63  12/1963  Japan .................. 350/215

*Primary Examiner*—Conrad J. Clark
*Attorney, Agent, or Firm*—Shapiro and Shapiro

[57] ABSTRACT

A wide angle photographic lens system comprises, in the order from the object side, a first lens component which is a positive lens having its more convex surface facing the object side, a second lens component which is a negative meniscus lens having its convex surface facing the object side, a third lens component which is a biconvex lens having its more convex surface facing the object side, a diaphragm, a fourth lens component which is a biconcave lens, a fifth lens component which is a positive meniscus lens having its convex surface facing the image side, and a sixth lens component which is a biconvex lens. Four distinctive optical conditions are characteristic of the lens system.

6 Claims, 6 Drawing Figures

SPHERICAL ABERRATION
--- SINE CONDITION

ASTIGMATISM

DISTORTION

SPHERICAL ABERRATION
--- SINE CONDITION

ASTIGMATISM

DISTORTION

WIDE ANGLE PHOTOGRAPHIC LENS

BACKGROUND OF THE INVENTION

1. Field of the Invention

This invention relates to a wide angle photographic lens having an aperture ratio of 1:3.5 and an angle of view of 75° which is compact and light in weight and which comprises only six lens components and yet has aberrations which are well corrected.

2. Description of the Prior Art

A lens of the type under consideration is disclosed in Japanese patent publication No. 26133/1963. The purpose of the present invention is to make a lens of this type more compact and to better correct the various aberrations thereof to thereby improve its performance. Usually, in a wide angle lens, it is advantageous to dispose a diaphragm as close as possible to the foremost lens component or to make the focal length of the front divergent lens group as small as possible in order that the entire lens may be compact with the aperture of the foremost lens component reduced.

In conventional lenses of this type, which comprise six lens components, the diaphragm is disposed between the second and third lens components so that the diaphragm may be as close as possible to the foremost lens component, or the diaphragm is disposed between the third and fourth lens components while the negative combined focal length of the first and second lens components is reduced to thereby reduce the aperture of the foremost lens component. However, in the former example wherein the diaphragm is disposed between the second and the third lens components, the lens components behind the diaphragm have been subjected to overstrain, and this has led to difficulties in terms of aberrations when the number of lens components is restricted to six lens components in six groups. In the latter example wherein the aperture of the foremost lens component is reduced with the negative combined focal length of the first and second lens components being minimized, the Petzval sum goes in the negative direction, and unavoidably this must be compensated for by thickening the lenses in the front group. As a result, it is difficult to achieve a lens which is light in weight. Also, the radius of curvature of the surface of the second lens component which faces the image side becomes necessarily small to permit bending of the image plane and coma to occur in such surface and thus aberrations are encountered.

SUMMARY OF THE INVENTION

It is an object of the present invention to provide a wide angle photographic lens which is made compact by reducing the aperture of the foremost lens component and in which the various aberrations are well corrected to enhance the performance of the lens.

To achieve such an object, the wide angle photographic lens system according to the present invention comprises, in the order from the object side, a first lens component which is a positive lens having its more convex surface facing the object side, a second lens component which is a negative meniscus lens having its convex surface facing the object side, a third lens component which is a biconvex lens having its more convex surface facing the object side, a diaphragm, a fourth lens component which is a biconcave lens, a fifth lens component which is a positive meniscus lens having its convex surface facing the image side, and a sixth lens component which is a biconvex lens. The lens system satisfies certain conditions which will be described hereinafter.

The invention will become more fully apparent from the following detailed description thereof taken in conjunction with the accompanying drawings.

DESCRIPTION OF THE PREFERRED EMBODIMENTS

Figure 1:
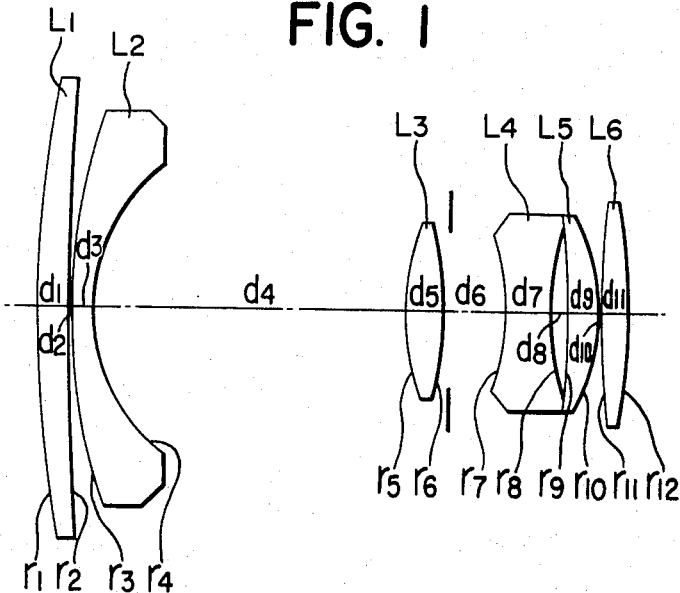
FIG. 1 is a cross-sectional view showing the construction of the lens system according to the present invention.
Figure 2:
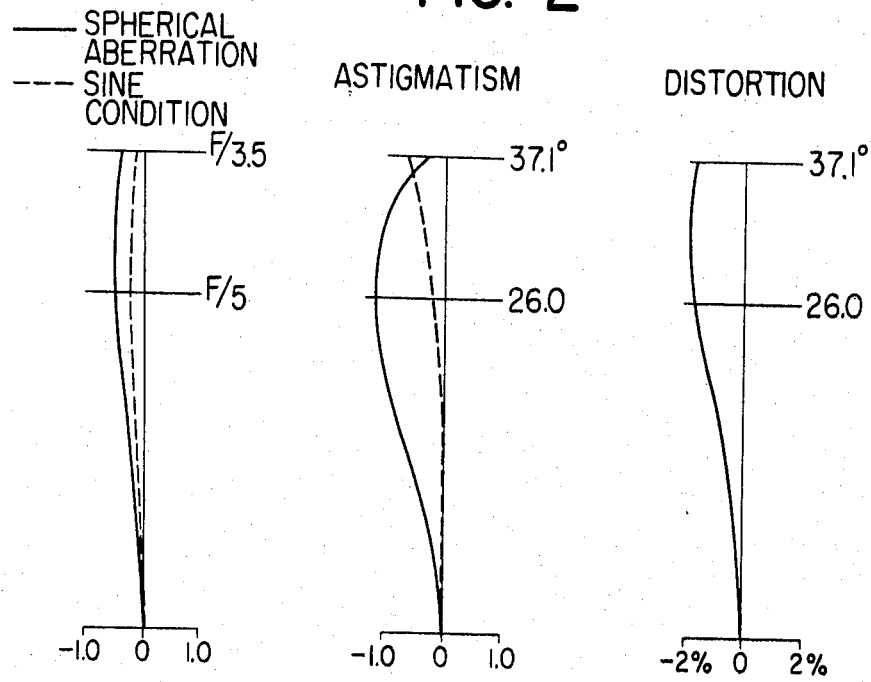
FIGS. 2 – 6 are graphs illustrating the corrections of the various aberrations in Examples 1 to 5, for the total focal length $f = 100$.
Figure 3:
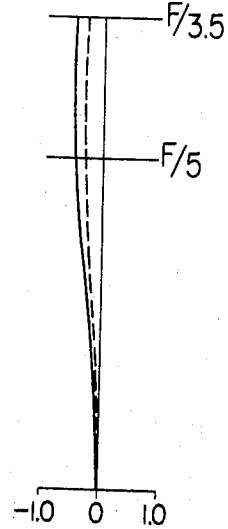
Figure 3:
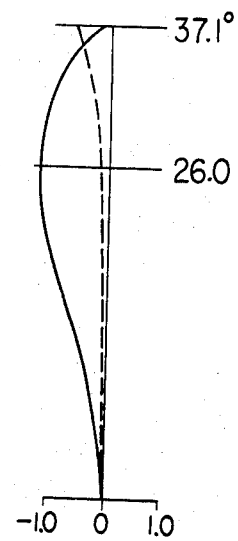
Figure 3:
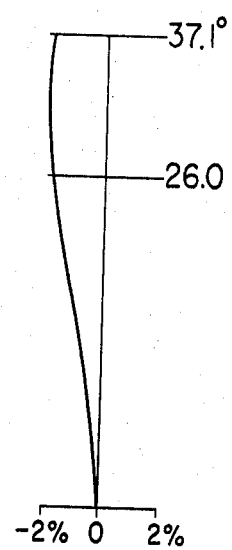
Figure 4:
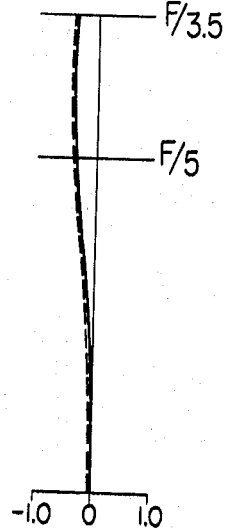
Figure 4:
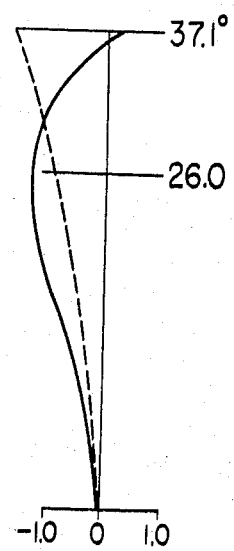
Figure 4:
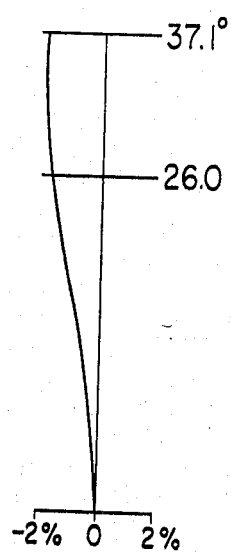
Figure 5:
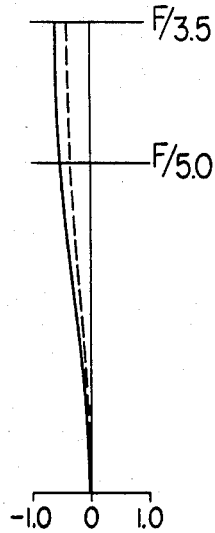
Figure 5:
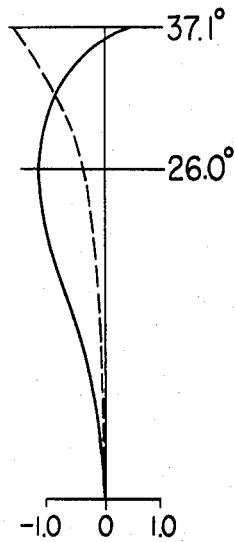
Figure 5:
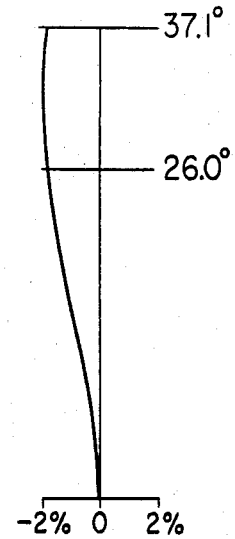
Figure 6:
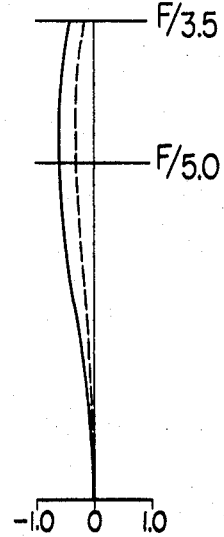
Figure 6:
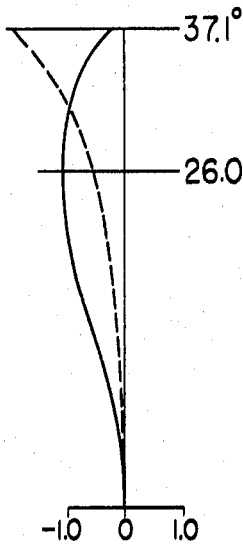
Figure 6:
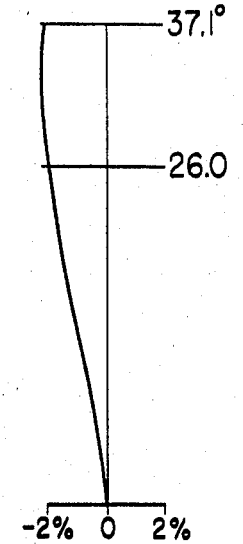

Referring to FIG. 1, a wide angle photographic lens system in accordance with the present invention comprises six lens components, in the order from the object side, a first lens component L1 which is a positive lens having its more convex surface facing the object side, a second lens component L2 which is a negative meniscus lens having its convex surface facing the object side, a third lens component L3 which is a biconvex lens having its more convex surface facing the object side, a fourth lens component L4 which is a biconcave lens, a fifth lens component L5 which is a positive meniscus lens having its convex surface facing the image side, and a sixth lens component L6 which is a biconvex lens. A diaphragm is positioned between the third and fourth lens components. This lens system satisfies the following conditions:

$$1.5f < |f_{12}| < 1.75f \qquad (1)$$

$$5.0 < f_1/|f_2| < 8.0 \qquad (2)$$

$$0.1 < (d_1 + d_2 + d_3)/d_4 < 0.35 \qquad (3)$$

$$0.5f < r_4 < 0.6f \qquad (4)$$

where $f$ is the total focal length of the lens system, $f_1$ and $f_2$ are the focal lengths of the first and the second lens components, respectively, $f_{12}$ is the combined focal length of the first and second lens components, $r_4$ is the curvature radius of the surface of the second lens component which faces the image side, $d_1$ and $d_3$ are the center thicknesses of the first and the second lens components respectively, and $d_2$ and $d_4$ are the air spaces between the first and second lens components and between the second and third lens components, respectively.

Each of the above conditions will now be considered. Condition (1) is intended to minimize the aperture of the foremost lens component where the diaphragm is disposed between the third and the fourth lens components. If $|f_{12}|$ is greater than its upper limit, the aperture of the foremost lens will increase and it will be difficult to make the entire lens system compact where the diaphragm is disposed between the third and the fourth lens components If, conversely, $|f_{12}|$ is smaller than its lower limit, a greater advantage will be experienced reducing the aperture of the foremost lens component but, as already described, the Petzval sum will go in the negative direction and this will have to be correct by thickening the lens components before the diaphragm, which in turn will lead to difficulty in making the entire system compact and light in weight, with the further result that the lower limit of condition (4) is exceeded, whereby inducing the bending of the image plane and aggravation of coma.

The purpose of condition (2) is to bring about a greater advantage where the aperture of the foremost lens component is minimized with condition (1) being satisfied. In other words, where the location of the diaphragm is set up, a greater advantage is obtained as the focal length $f_1$ of the first lens component is greater, or the absolute value $|f_2|$ of the focal length of the second lens component is smaller, and thus, the greater value of $f_1/|f_2|$, the better the result. Where $|f_{12}|$ is restricted to condition (1), a greater value of $f_1/|f_2|$ will result in a relatively small value of $|f_2|$ and an increased power of the second lens component, and therefore, the upper limit of condition (2) is exceeded to increase the power of the second lens component to inadequately correct the various aberrations. Conversely, when the lower limit of condition (2) is exceeded, the resulting disadvantage is that the aperture of the foremost lens component is reduced.

Condition (3) serves to bring about good correction of the various aberrations while increasing the back focal distance to $1.3f$ or greater. Also, the aperture of the foremost lens component is reduced so that a compact and light weight lens system is obtained.

The inter-vertex distance $d_4$ between the second lens component and the third lens component should preferably be great in order to correct the aberrations or to increase the back focal distance, though this would offer the disadvantage that the aperture of the foremost lens component is increased. Also, a smaller value of $(d_1+d_2+d_3)$ is advantageous to reduce the aperture of the foremost lens component and useful to realize a compact and light weight lens system. Where the advantage of compactness and light weight is brought about by decreasing $(d_1+d_2+d_3)$, it is possible to increase the back focal distance and facilitate the correction of the aberrations by increasing $d_4$ correspondingly, but if the lower limit of condition (3) is exceeded to increase the difference between $d_4$ and $(d_1+d_2+d_3)$, an adverse result will occur in that the aperture of the foremost lens component is increased. Conversely, within such range that the back focal length of $1.3f$ or greater is properly attained while the correction of the aberrations is ensured, it is also possible to minimize $d_4$ to thereby bring about the advantage of reducing the aperture of the foremost lens component. However, if the upper limit of condition (3) is exceeded, difficulties will be encountered in realizing compactness and light weight.

Condition (4) is intended to restrict the curvature radius of the surface of the second lens component facing the image side and provide a back focal distance of $1.3f$ or greater, whereby the bending of the image plane and the coma which tend to occur in said surface may be kept within reasonable bounds. If the upper limit of this condition is exceeded, the result would be a back focal distance of less than $1.3f$ and an increase in the aperture of the foremost lens component. Conversely, if the lower limit of this condition were to be exceeded to intensify the curvature of the surface under consideration, it would be difficult to correct the bending of the image plane and the coma occurring and this surface.

Preferred examples of the lens system according to the present invention will be shown below, in which $r$, $d$, $nd$ and $\nu d$, respectively, represent the curvature radius of each refracting surface, the center thickness of each lens component or the air space between adjacent lens components, the refractive index of each lens component, and the Abbe number of each lens component, the subscripts representing the order from the object side.

EXAMPLE 1 total focal length f = 100.0   aperture ratio 1:3.5
angle of view $2\omega$ = 74.2°

| | | | | |
|---|---|---|---|---|
| $r_1 =$ | 386.719 | $d_1 =$ | 9.199 $nd_1 =$ 1.62374 | $\nu d_1 = 47.0$ |
| $r_2 =$ | 1871.551 | $d_2 =$ | 0.343 | |
| $r_3 =$ | 167.545 | $d_3 =$ | 4.909 $nd_2 =$ 1.62041 | $\nu d_2 = 60.3$ |
| $r_4 =$ | 55.370 | $d_4 =$ | 93.708 | |
| $r_5 =$ | 85.216 | $d_5 =$ | 9.611 $nd_3 =$ 1.70154 | $\nu d_3 = 41.1$ |
| $r_6 =$ | −197.175 | $d_6 =$ | 19.222 | |
| $r_7 =$ | −77.840 | $d_7 =$ | 15.446 $nd_4 =$ 1.7552 | $\nu d_4 = 27.5$ |
| $r_8 =$ | 120.630 | $d_8 =$ | 3.776 | |
| $r_9 =$ | −265.822 | $d_9 =$ | 9.268 $nd_5 =$ 1.62041 | $\nu d_5 = 60.3$ |
| $r_{10} =$ | −64.116 | $d_{10} =$ | 0.343 | |
| $r_{11} =$ | 285.350 | $d_{11} =$ | 8.581 $nd_6 =$ 1.58913 | $\nu d_6 = 61.2$ |
| $r_{12} =$ | −150.156 | | | | back focal distance = 133.975
$f_{12} = -167.233$

EXAMPLE 2 total focal length f = 100.0   aperture ratio 1:3.5
angle of view $2\omega$ = 74.2°

| | | | | |
|---|---|---|---|---|
| $r_1 =$ | 897.870 | $d_1 =$ | 8.026 $nd_1 =$ 1.62374 | $\nu d_1 = 47.0$ |
| $r_2 =$ | −3310.382 | $d_2 =$ | 0.343 | |
| $r_3 =$ | 136.893 | $d_3 =$ | 4.253 $nd_2 =$ 1.62041 | $\nu d_2 = 60.3$ |
| $r_4 =$ | 53.140 | $d_4 =$ | 93.631 | |
| $r_5 =$ | 84.333 | $d_5 =$ | 9.603 $nd_3 =$ 1.70154 | $\nu d_3 = 41.1$ |
| $r_6 =$ | −174.397 | $d_6 =$ | 19.206 | |
| $r_7 =$ | −76.308 | $d_7 =$ | 15.434 $nd_4 =$ 1.7552 | $\nu d_4 = 27.5$ |
| $r_8 =$ | 115.280 | $d_8 =$ | 3.773 | |
| $r_9 =$ | −306.739 | $d_9 =$ | 9.260 $nd_5 =$ 1.62041 | $\nu d_5 = 60.3$ |
| $r_{10} =$ | −64.352 | $d_{10} =$ | 0.343 | |
| $r_{11} =$ | 287.241 | $d_{11} =$ | 8.574 $nd_6 =$ 1.58913 | $\nu d_6 = 61.2$ |
| $r_{12} =$ | −166.025 | | | | back focal distance = 132.016
$f_{12} = -164.787$

EXAMPLE 3 total focal length f = 100.0   aperture ratio 1:3.5
angle of view $2\omega$ = 74.2°

| | | | | |
|---|---|---|---|---|
| $r_1 =$ | 367.133 | $d_1 =$ | 12.226 $nd_1 =$ 1.60323 | $\nu d_1 = 42.5$ |
| $r_2 =$ | 3881.119 | $d_2 =$ | 2.448 | |
| $r_3 =$ | 180.070 | $d_3 =$ | 5.594 $nd_2 =$ 1.58913 | $\nu d_2 = 61.2$ |
| $r_4 =$ | 51.923 | $d_4 =$ | 80.420 | |
| $r_5 =$ | 90.210 | $d_5 =$ | 16.434 $nd_3 =$ 1.72342 | $\nu d_3 = 38.0$ |
| $r_6 =$ | −202.098 | $d_6 =$ | 18.531 | |
| $r_7 =$ | −81.119 | | | |

-continued

| | | | | | |
|---|---|---|---|---|---|
| $r_8 =$ | 128.671 | $d_7 =$ | 12.238 | $nd_4 = 1.80518$ | $\gamma d_4 = 25.5$ |
| $r_9 =$ | −699.301 | $d_8 =$ | 6.643 | | |
| $r_{10} =$ | −70.175 | $d_9 =$ | 12.937 | $nd_5 = 1.713$ | $\gamma d_5 = 53.9$ |
| $r_{11} =$ | 262.238 | $d_{10} =$ | 1.049 | | |
| $r_{12} =$ | 174.275 | $d_{11} =$ | 9.091 | $nd_6 = 1.5168$ | $\gamma d_6 = 64.2$ | back focal distance = 132.455
$f_{12} = -160.839$

EXAMPLE 4 total focal length f = 100.0   aperture ratio 1:3.5
angle of view ω2 = 74.2°

| | | | | | |
|---|---|---|---|---|---|
| $r_1 =$ | 349.650 | $d_1 =$ | 13.986 | $nd_1 = 1.60323$ | $\gamma d_1 = 42.5$ |
| $r_2 =$ | 3461.538 | $d_2 =$ | 2.448 | | |
| $r_3 =$ | 171.329 | $d_3 =$ | 5.594 | $nd_2 = 1.62041$ | $\gamma d_2 = 60.3$ |
| $r_4 =$ | 52.448 | $d_4 =$ | 80.420 | | |
| $r_5 =$ | 87.413 | $d_5 =$ | 11.189 | $nd_3 = 1.172342$ | $\gamma d_3 = 38.0$ |
| $r_6 =$ | −228.479 | $d_6 =$ | 18.182 | | |
| $r_7 =$ | −85.564 | $d_7 =$ | 13.986 | $nd_4 = 1.78470$ | $\gamma d_4 = 26.1$ |
| $r_8 =$ | 117.626 | $d_8 =$ | 6.643 | | |
| $r_9 =$ | −699.301 | $d_9 =$ | 11.888 | $nd_5 = 1.69680$ | $\gamma d_5 = 55.6$ |
| $r_{10} =$ | −68.706 | $d_{10} =$ | 1.049 | | |
| $r_{11} =$ | 227.273 | $d_{11} =$ | 9.091 | $nd_6 = 1.48749$ | $\gamma d_6 = 70.0$ |
| $r_{12} =$ | −182.003 | | | | | back focal distance = 134.343
$f_{12} = -159.091$

EXAMPLE 5 total focal length f = 100.0   aperture ratio 1:3.5
angle of view 2ω = 74.2°

| | | | | | |
|---|---|---|---|---|---|
| $r_1 =$ | 356.822 | $d_1 =$ | 10.490 | $nd_1 = 1.62374$ | $\gamma d_1 = 47.0$ |
| $r_2 =$ | 2169.231 | $d_2 =$ | 0.350 | | |
| $r_3 =$ | 199.301 | $d_3 =$ | 5.594 | $nd_2 = 1.62041$ | $\gamma d_2 = 60.3$ |
| $r_4 =$ | 55.245 | $d_4 =$ | 95.455 | | |
| $r_5 =$ | 84.965 | $d_5 =$ | 9.790 | $nd_3 = 1.70154$ | $\gamma d_3 = 41.1$ |
| $r_6 =$ | −187.203 | $d_6 =$ | 19.580 | | |
| $r_7 =$ | −75.150 | $d_7 =$ | 15.734 | $nd_4 = 1.7552$ | $\gamma d_4 = 27.5$ |
| $r_8 =$ | 122.028 | $d_8 =$ | 3.846 | | |
| $r_9 =$ | −314.685 | $d_9 =$ | 9.441 | $nd_5 = 1.62041$ | $\gamma d_5 = 60.3$ |
| $r_{10} =$ | −63.217 | $d_{10} =$ | 0.350 | | |
| $r_{11} =$ | 286.713 | $d_{11} =$ | 8.741 | $nd_6 = 1.58913$ | $\gamma d_6 = 61.2$ |
| $r_{12} =$ | −174.126 | | | | | back focal distance = 137.350
$f_{12} = -156.643$

According to the present invention, as seen in FIGS. 2 - 6, the aperture of the foremost lens component is smaller by about 19% than in the lens system of the aforementioned Japanese patent publication No. 26133/1963, and yet the performance is much improved even in terms of aberrations. Such a reduced aperture of the foremost lens component affords the realization of compactness and light weight of the entire lens system. Also, there is prevention of the interception of the marginal rays or the reduction in quantity of the marginal light which would be caused by a filter being mounted on the lens system.

It is believed that the advantages and improved results furnished by the improved wide angle lens systems of the invention will be apparent from the foregoing description of several preferred embodiments of the invention. Various changes and modifications may be made without departing from the spirit and scope of the invention as sought to be defined in the following claims.

I claim:

1. A wide angle photographic lens system comprising in the order from the object side, a first lens component which is a positive lens having its more convex surface facing the object side, a second lens component which is a negative meniscus lens having its convex surface facing the object side, a third lens component which is a biconvex lens having its more convex surface facing the object side, a diaphragm, a fourth lens component which is a biconcave lens, a fifth lens component which is a positive meniscus lens having its convex surface facing the image side, and a sixth lens component which is a biconvex lens, said lens system satisfying the following conditions:

$$1.5f < |f_{12}| < 1.75f \quad (1)$$

$$5.0 < f_1/|f_2| < 8.0 \quad (2)$$

$$0.1 < d_1 + d_2 + d_3/d_4 < 0.35 \quad (3)$$

$$0.5f < r_4 < 0.6f \quad (4)$$

where $f$ is the total focal length of the lens system, $f_1$ and $f_2$ are the focal lengths of the first and the second lens components, respectively, $f_{12}$ is the combined focal length of the first and second lens components, $r_4$ is the curvature radius of the surface of the second lens component which faces the image side, $d_1$ and $d_3$ are the center thicknesses of the first and the second lens components, respectively, and $d_2$ and $d_4$ are the air spaces between the first and second lens components and between the second and third lens components, respectively.

2. A lens system according to claim 1, wherein the numerical data are as shown in the following table:

| Radii | | Thicknesses and air spaces | | Refractive indexes | Abbe numbers |
|---|---|---|---|---|---|
| $r_1 =$ | 386.719 | $d_1 =$ | 9.199 | $nd_1 = 1.62374$ | $\gamma d_1 = 47.0$ |
| $r_2 =$ | 1871.551 | $d_2 =$ | 0.343 | | |
| $r_3 =$ | 167.545 | $d_3 =$ | 4.909 | $nd_2 = 1.62041$ | $\gamma d_2 = 60.3$ |
| $r_4 =$ | 55.370 | $d_4 =$ | 93.708 | | |
| $r_5 =$ | 85.216 | $d_5 =$ | 9.611 | $nd_3 = 1.70154$ | $\gamma d_3 = 41.1$ |
| $r_6 =$ | −197.175 | $d_6 =$ | 19.222 | | |
| $r_7 =$ | −77.840 | $d_7 =$ | 15.446 | $nd_4 = 1.7552$ | $\gamma d_4 = 27.5$ |
| $r_8 =$ | 120.630 | $d_8 =$ | 3.776 | | |
| $r_9 =$ | −265.822 | $d_9 =$ | 9.268 | $nd_5 = 1.62041$ | $\gamma d_5 = 60.3$ |
| $r_{10} =$ | −64.116 | $d_{10} =$ | 0.343 | | |
| $r_{11} =$ | 285.350 | $d_{11} =$ | 8.581 | $nd_6 = 1.58913$ | $\gamma d_6 = 61.2$ |
| $r_{12} =$ | −150.156 | | | | |

3. A lens system according to claim 1, wherein the numerical data are as shown in the following table:

| Radii | Thicknesses and air spaces | Refractive indexes | Abbe Numbers |
|---|---|---|---|
| $r_1 = 897.870$ | | | |
| | $d_1 = 8.026$ | $nd_1 = 1.62374$ | $\gamma d_1 = 47.0$ |
| $r_2 = -3310.382$ | | | |
| | $d_2 = 0.343$ | | |
| $r_3 = 136.893$ | | | |
| | $d_3 = 4.253$ | $nd_2 = 1.62041$ | $\gamma d_2 = 60.3$ |
| $r_4 = 53.140$ | | | |
| | $d_4 = 93.631$ | | |
| $r_5 = 84.333$ | | | |
| | $d_5 = 9.603$ | $nd_3 = 1.70154$ | $\gamma d_3 = 41.1$ |
| $r_6 = -174.397$ | | | |
| | $d_6 = 19.206$ | | |
| $r_7 = -76.308$ | | | |
| | $d_7 = 15.434$ | $nd_4 = 1.7552$ | $\gamma d_4 = 27.5$ |
| $r_8 = 115.280$ | | | |
| | $d_8 = 3.773$ | | |
| $r_9 = -306.739$ | | | |
| | $d_9 = 9.260$ | $nd_5 = 1.62041$ | $\gamma d_5 = 60.3$ |
| $r_{10} = -64.352$ | | | |
| | $d_{10} = 0.343$ | | |
| $r_{11} = 287.241$ | | | |
| | $d_{11} = 8.574$ | $nd_6 = 1.58913$ | $\gamma d_6 = 61.2$ |
| $r_{12} = -166.025$ | | | |

4. A lens system according to claim 1, wherein the numerical data are as shown in the following table:

| Radii | Thicknesses and air spaces | Refractive indexes | Abbe numbers |
|---|---|---|---|
| $r_1 = 367.133$ | | | |
| | $d_1 = 12.226$ | $nd_1 = 1.60323$ | $\gamma d_1 = 42.5$ |
| $r_2 = 3881.119$ | | | |
| | $d_2 = 2.448$ | | |
| $r_3 = 180.070$ | | | |
| | $d_3 = 5.594$ | $nd_2 = 1.58913$ | $\gamma d_2 = 61.2$ |
| $r_4 = 51.923$ | | | |
| | $d_4 = 80.420$ | | |
| $r_5 = 90.210$ | | | |
| | $d_5 = 16.434$ | $nd_3 = 1.72342$ | $\gamma d_3 = 38.0$ |
| $r_6 = -202.098$ | | | |
| | $d_6 = 18.531$ | | |
| $r_7 = -81.119$ | | | |
| | $d_7 = 12.238$ | $nd_4 = 1.80518$ | $\gamma d_4 = 25.5$ |
| $r_8 = 128.671$ | | | |
| | $d_8 = 6.643$ | | |
| $r_9 = -699.301$ | | | |
| | $d_9 = 12.937$ | $nd_5 = 1.713$ | $\gamma d_5 = 53.9$ |
| $r_{10} = -70.175$ | | | |
| | $d_{10} = 1.049$ | | |
| $r_{11} = 262.238$ | | | |
| | $d_{11} = 9.091$ | $nd_6 = 1.5168$ | $\gamma d_6 = 64.2$ |
| $r_{12} = 174.275$ | | | |

5. A lens system according to claim 1, wherein the numerical data are as shown in the following table:

| Radii | Thicknesses and air spaces | Refractive indexes | Abbe numbers |
|---|---|---|---|
| $r_1 = 349.650$ | | | |
| | $d_1 = 13.986$ | $nd_1 = 1.60323$ | $\gamma d_1 = 42.5$ |
| $r_2 = 3461.538$ | | | |
| | $d_2 = 2.448$ | | |
| $r_3 = 171.329$ | | | |
| | $d_3 = 5.594$ | $nd_2 = 1.62041$ | $\gamma d_1 = 60.3$ |
| $r_4 = 52.448$ | | | |
| | $d_4 = 80.420$ | | |
| $r_5 = 87.413$ | | | |
| | $d_5 = 11.189$ | $nd_3 = 1.72342$ | $\gamma d_3 = 38.0$ |
| $r_6 = -228.479$ | | | |
| | $d_6 = 18.182$ | | |
| $r_7 = -85.564$ | | | |
| | $d_7 = 13.986$ | $nd_4 = 1.78470$ | $\gamma d_4 = 26.1$ |
| $r_8 = 117.626$ | | | |
| | $d_8 = 6.643$ | | |
| $r_9 = -699.301$ | | | |
| | $d_9 = 11.888$ | $nd_5 = 1.69680$ | $\gamma d_5 = 55.6$ |
| $r_{10} = -68.706$ | | | |
| | $d_{10} = 1.049$ | | |
| $r_{11} = 227.273$ | | | |
| | $d_{11} = 9.091$ | $nd_6 = 1.48749$ | $\gamma d_6 = 70.0$ |
| $r_{12} = -182.003$ | | | |

6. A lens system according to claim 1, wherein the numerical data are as shown in the following table:

| Radii | Thicknesses and air spaces | Refractive indexes | Abbe numbers |
|---|---|---|---|
| $r_1 = 356.822$ | | | |
| | $d_1 = 10.490$ | $nd_1 = 1.62374$ | $\gamma d_1 = 47.0$ |
| $r_2 = 2169.231$ | | | |
| | $d_2 = 0.350$ | | |
| $r_3 = 199.301$ | | | |
| | $d_3 = 5.594$ | $nd_2 = 1.62041$ | $\gamma d_2 = 60.3$ |
| $r_4 = 55.245$ | | | |
| | $d_4 = 95.455$ | | |
| $r_5 = 84.965$ | | | |
| | $d_5 = 9.790$ | $nd_3 = 1.70154$ | $\gamma d_3 = 41.1$ |
| $r_6 = -187.203$ | | | |
| | $d_6 = 19.580$ | | |
| $r_7 = -75.150$ | | | |
| | $d_7 = 15.734$ | $nd_4 = 1.7552$ | $\gamma d_4 = 27.5$ |
| $r_8 = 122.028$ | | | |
| | $d_8 = 3.846$ | | |
| $r_9 = -314.685$ | | | |
| | $d_9 = 9.441$ | $nd_5 = 1.62041$ | $\gamma d_5 = 60.3$ |
| $r_{10} = -63.217$ | | | |
| | $d_{10} = 0.350$ | | |
| $r_{11} = 286.713$ | | | |
| | $d_{11} = 8.741$ | $nd_6 = 1.58913$ | $\gamma d_6 = 61.2$ |
| $r_{12} = -174.126$ | | | |

* * * * *

UNITED STATES PATENT AND TRADEMARK OFFICE
CERTIFICATE OF CORRECTION

PATENT NO. : 4,099,850
DATED : July 11, 1978
INVENTOR(S) : Sei Matsui

It is certified that error appears in the above-identified patent and that said Letters Patent are hereby corrected as shown below:

Column 6, equation (3), at line 30, should read:

$$-- \; 0.1 < (d_1 + d_2 + d_3)/d_4 < 0.35 \qquad (3) \; --$$

Signed and Sealed this

Twenty-seventh Day of March 1979

[SEAL]

Attest:

RUTH C. MASON
*Attesting Officer*

DONALD W. BANNER
*Commissioner of Patents and Trademarks*